(12) United States Patent
Yasaki

(10) Patent No.: US 10,389,911 B2
(45) Date of Patent: Aug. 20, 2019

(54) ORIGINAL READING APPARATUS

(71) Applicant: CANON KABUSHIKI KAISHA, Tokyo (JP)

(72) Inventor: Kosuke Yasaki, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/940,587

(22) Filed: Mar. 29, 2018

(65) Prior Publication Data

US 2018/0295256 A1    Oct. 11, 2018

(30) Foreign Application Priority Data

Apr. 7, 2017 (JP) ................................ 2017-076526

(51) Int. Cl.
*H04N 1/00* (2006.01)
*H04N 1/193* (2006.01)
*H04N 1/409* (2006.01)

(52) U.S. Cl.
CPC ....... *H04N 1/4097* (2013.01); *H04N 1/00588* (2013.01); *H04N 1/193* (2013.01); *H04N 2201/0081* (2013.01)

(58) Field of Classification Search
CPC .. H04N 1/4097; H04N 1/193; H04N 1/00588; H04N 2201/0081
See application file for complete search history.

(56) References Cited

U.S. PATENT DOCUMENTS 8,203,761 B2    6/2012  Arima .......................... 358/3.26

FOREIGN PATENT DOCUMENTS

JP        2005-117090       4/2005

*Primary Examiner* — Christopher Wait
(74) *Attorney, Agent, or Firm* — Venable LLP

(57) ABSTRACT

Provided is an image reading apparatus, which is configured to correct a streak image in such a manner as to prevent a correction trace from becoming noticeable even when a streak changes in thickness. The image reading apparatus performs streak image correction for detecting a streak pixel that forms the streak image from image data obtained by reading an original being conveyed. A control unit of the image reading apparatus stores a value of a hysteresis width with a value of a detected streak width being set as an initial value. Each time the streak width is detected, the control unit increments a value of a hysteresis counter when the value of the detected streak width is equal to the value of the hysteresis width, and decrements the value of the hysteresis counter when the value of the detected streak width is different from that of the hysteresis width.

6 Claims, 14 Drawing Sheets

MAIN SCANNING DIRECTION X

ABNORMAL IMAGE

NORMAL IMAGE

EXAMPLE OF FORMED STREAK

ORIGINAL READING APPARATUS

BACKGROUND OF THE INVENTION

Field of the Invention

The present invention relates to an original reading apparatus, for example, a scanner, which is configured to read an image from an original.

Description of the Related Art

Some image reading apparatus have a function of not only reading an image from an original placed on an original table on a one-by-one basis but also reading images continuously while conveying the originals one by one through use of an auto document feeder (hereinafter referred to as "ADF"). In any of the above-mentioned cases, an image reading apparatus irradiates a surface of an original to be read (hereinafter referred to as "original surface") with light, scans the light on the original surface, and receives its reflected light through use of a charge coupled device (CCD) or other such image pickup element, to thereby read an image. The image reading apparatus transmits the read image as image data to an image forming apparatus, a personal computer, or other such external apparatus.

In the case of reading images continuously while conveying originals, due to mechanical friction or bending of an original during conveyance, paper dust may be generated on an original itself or toner printed on an original may be peeled off. The paper dust or the peeled-off toner may be moved as foreign particles while the original is being conveyed, and may be read together with the original. When an original is read together with the foreign particles, a defective image is formed in the read image. For example, the light irradiating the original surface is partially blocked, with the result that streaks (streak images) are intermittently formed as abnormal images in the read image.

There has been employed a technology for detecting and correcting, through image processing, a streak image or other such abnormal image formed in such a manner. In Japanese Patent Application Laid-open No. 2005-117090, there is proposed a technology for detecting a pattern in which a given image continuously appears in a sub-scanning direction in order to discriminate a streak due to foreign particles from the read image. When a length of the detected pattern exceeds a predetermined threshold value, the pattern is determined as a streak image and starts being corrected, and when the pattern disappears at some midpoint, the correction is stopped.

In U.S. Pat. No. 8,203,761, there is disclosed a technology for correcting a streak image after determining that the streak image has been formed when a predetermined number or more of lines of pixels having a predetermined pixel value are arranged in the sub-scanning direction of light being applied to an original (conveyance direction of the original). In U.S. Pat. No. 8,203,761, even when a streak stops being detected at some midpoint of an image, an algorithm for detection of a streak is changed between before and after the detection of the streak, to thereby perform the correction of a streak over a predetermined length in the sub-scanning direction for an extended duration. With this configuration, even when a streak image overlaps with a character or a ruled line included in the original, the streak image is detected and corrected with stability.

However, there is a case in which an image on the original itself is erroneously detected as a streak only by performing the detection and the correction in accordance with a streak or other such abnormal image that has been formed. In addition, in a case where a streak varying in thickness in accordance with movement of foreign particles has been formed, there is a problem that, with such correction as to follow the change, the streak to be corrected becomes thicker, which causes a correction trace to become rather noticeable. For example, when a streak has been formed in a Japanese character pronounced as "dʒúñ", which means "pure", as illustrated in FIG. 17, it is possible to obtain a corrected image without a sense of discomfort as illustrated in FIG. 18 by correcting the streak as a thin streak.

However, when the correction is performed by following the change in thickness of the streak, the streak that has been formed may be corrected as a thick streak in some cases. In such cases, it may be difficult to interpret an original image in a background as illustrated in FIG. 19. This causes an adverse effect that a correction trace may be noticeable with a method of performing the correction based on a streak varying in thickness.

In addition, in the case of processing for switching the algorithm for detection of a streak between before and after the detection of the streak, the algorithm for detection of a streak becomes complicated, which leads to a fear that the processing may require more time and more circuits.

SUMMARY OF THE INVENTION

An original reading apparatus according to the present disclosure includes an original tray on which an original is to be placed; a conveyor configured to convey the original from the original tray to a reading position; a reader configured to read the original being conveyed by the conveyor, and to output image data; and an image processor configured to detect a streak image based on the image data, and to correct the detected streak image, wherein the image processor is configured to: determine, based on the image data on a pixel of interest and pixels that surround the pixel of interest, whether the pixel of interest is a streak image candidate; determine, when the pixel of interest is a streak image candidate, a streak image width in a direction perpendicular to a conveyance direction of the original; determine, based on first information indicating a degree of continuity of the streak image candidate in the conveyance direction, whether the pixel of the streak image candidate is to be corrected; and determine a correction width of the streak image to be corrected by the image processor in the direction perpendicular to the conveyance direction based on second information indicating a degree of continuity of the streak image candidate having the same streak image width, in the conveyance direction.

Further features of the present invention will become apparent from the following description of exemplary embodiments (with reference to the attached drawings).

DESCRIPTION OF THE EMBODIMENTS

Now, an embodiment of the present invention is described in detail with reference to the drawings. A configuration of an apparatus described in this embodiment and a procedure for determining a reading position are merely examples for describing proposed contents, and the present invention is not limited to the contents described herein.

Figure 1:
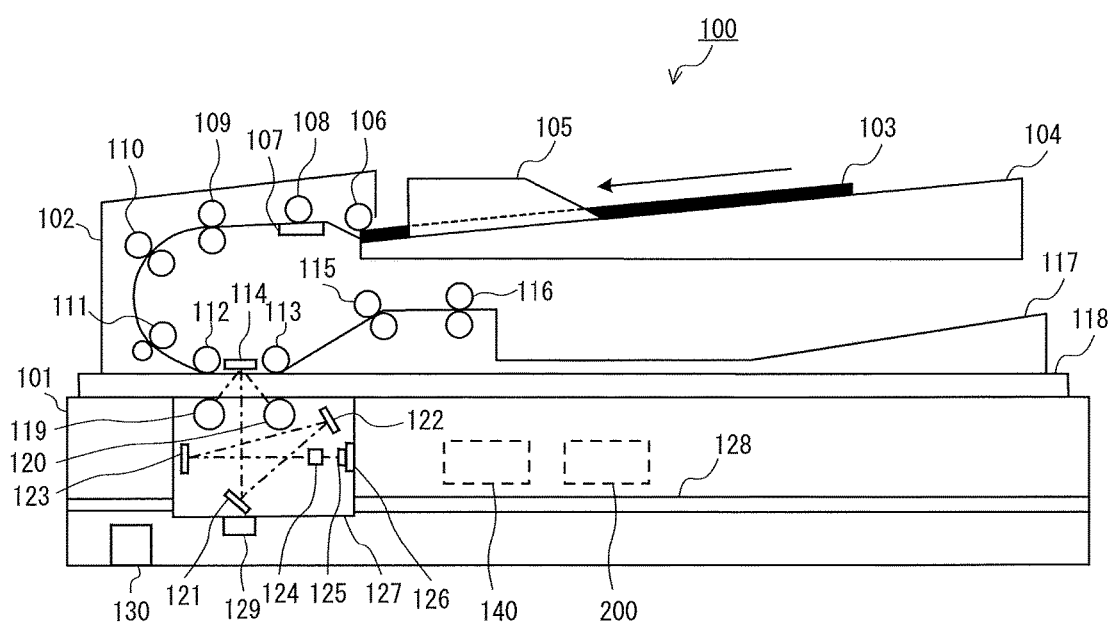
FIG. 1 is a configuration diagram of an image reading apparatus.

FIG. 1 is a configuration diagram of an image reading apparatus 100 according to this embodiment. The image reading apparatus 100 includes a reading section 101 configured to irradiate an original to read an image, and an ADF 102 being an auto document feeder configured to convey an original to a reading position of the reading section 101. A reading glass 118 is provided on the reading section 101. The ADF 102 is provided on the reading glass 118. The image reading apparatus 100 includes a built-in control unit 200. The control unit 200 controls operations of respective components of the image reading apparatus 100.

The ADF 102 includes an original tray 104 on which an original stack being a stack of a plurality of originals 103 is to be placed. The ADF 102 conveys the originals 103 from the original stack to the reading position one by one. The original stack is brought into abutment with a width regulating plate 105 on the original tray 104, and skew of the original 103 is suppressed during conveyance of the original 103. In order to convey the original 103 from the original tray 104 to the reading position, the ADF 102 includes a pickup roller 106, a separation pad 107, a separation roller 108, first registration rollers 109, second registration rollers 110, first conveyance rollers 111, and a second conveyance roller 112. The ADF 102 includes an original delivery tray 117 configured to deliver the original 103 whose image has been read. In order to deliver the original 103 that has passed through the reading position to the original delivery tray 117, the ADF 102 includes a third conveyance roller 113, fourth conveyance rollers 115, and delivery rollers 116. The ADF 102 includes a white opposing member 114 at the reading position for the original 103.

The pickup roller 106 conveys the original stack placed on the original tray 104 to a separation portion formed of the separation pad 107 and the separation roller 108. The separation portion separates the originals 103 from the conveyed original stack one by one in order. The first registration rollers 109 and the second registration rollers 110 convey the one separated original 103 while correcting a skew of the original 103 with respect to a conveyance direction. The first conveyance rollers 111, the second conveyance roller 112, and the third conveyance roller 113 convey the original 103 that has been conveyed from the second registration rollers 110 in the stated order. The reading position for the original 103 is set between the second conveyance roller 112 and the third conveyance roller 113. The original 103 has the image read by a reading unit 127 provided at the reading position, which is described later, while being conveyed from the second conveyance roller 112 to the third conveyance roller 113.

The original 103 whose image has been read is conveyed by the fourth conveyance rollers 115, and is delivered to the original delivery tray 117 by the delivery rollers 116. The original 103 is conveyed through space between the white opposing member 114 and the reading glass 118.

The original 103 is conveyed so as to have an original surface facing downward at the reading position in FIG. 1. Therefore, the original 103 is placed on the original tray 104 with the original surface facing upward, and is delivered onto the original delivery tray 117 with the original surface facing downward.

The reading unit 127 is provided in the reading section 101 at such a position as to be opposed to the white opposing member 114 across the reading glass 118. The reading unit 127 includes light sources 119 and 120, reflective mirrors 121, 122, and 123, an imaging lens 124, a line sensor 125, and a signal processing unit 126.

The light sources 119 and 120 emit light toward the white opposing member 114. When the original 103 passes through the reading position, the original surface of the original 103 is irradiated with the light emitted from the light sources 119 and 120. For example, even with the original 103 having images formed on both sides thereof, the white opposing member 114 can prevent the image on the back side of the original 103 from being read. The reflective mirrors 121, 122, and 123 guide reflected light of the light applied to the original surface of the original 103 to the imaging lens 124. The imaging lens 124 images the converged light onto the line sensor 125 obtained by arraying CCDs or other such image pickup elements in a line. The line sensor 125 is a sensor for reading an image, and is a device formed of CCDs or the like, which is obtained by forming the plurality of image pickup elements in a line in a direction (perpendicular direction) perpendicular to the conveyance direction of an original to be subjected to flow reading. The light imaged onto the line sensor 125 is converted into an electric signal through photoelectric conversion to be input to the signal processing unit 126.

In a case of reading a color image, line sensors corresponding to three colors are provided in parallel with one another, and incident light is separated into respective colors of R, G, and B by color filters provided on front surfaces of the respective line sensors, and is caused to enter the respective line sensors. The signal processing unit 126 operates as an A/D converter configured to convert the input electric signal into a digital signal. The digital signal is used as image data representing the image read from the original 103.

The reading unit 127 reads the image from the original 103 in this manner, and inputs the generated image data to the control unit 200. The reading unit 127 uses the line sensor 125, and is therefore able to read the image on the original line by line.

As described above, the line sensor 125 has a plurality of image pickup elements arranged in the perpendicular direction of the original 103, and hence an image on the original 103 is read with the perpendicular direction, namely, a main scanning direction, being set as one line. The image data is generated for each line. The image data may be input to the control unit 200 as data corresponding to one page, or may be input for each line. The reading unit 127 is movable along a rail 128 in the left-right direction of FIG. 1.

A protruding portion 129 and a flag sensor 130 are provided in order to set a reference position serving as a reference for determining the position of the reading unit 127. The protruding portion 129 is provided to a lower part of the reading unit 127. The flag sensor 130 is provided on a base plate of the reading section 101. When the protruding portion 129 passes through the flag sensor 130 in accordance with the movement of the reading unit 127, the flag sensor 130 detects that the protruding portion 129 has passed through the flag sensor 130, and generates a pulse signal. The pulse signal is input to the control unit 200. When receiving the pulse signal, the control unit 200 determines that the reading unit 127 has passed through the position of the flag sensor 130. With the position of the flag sensor 130 being set as the reference position, the control unit 200 counts the number of pulses of a drive pulse signal output from a drive motor 140 of the reading unit 127 after receiving the pulse signal. As a result, it is possible to determine a relative position of the reading unit 127 with respect to the reference position.

Figure 2:
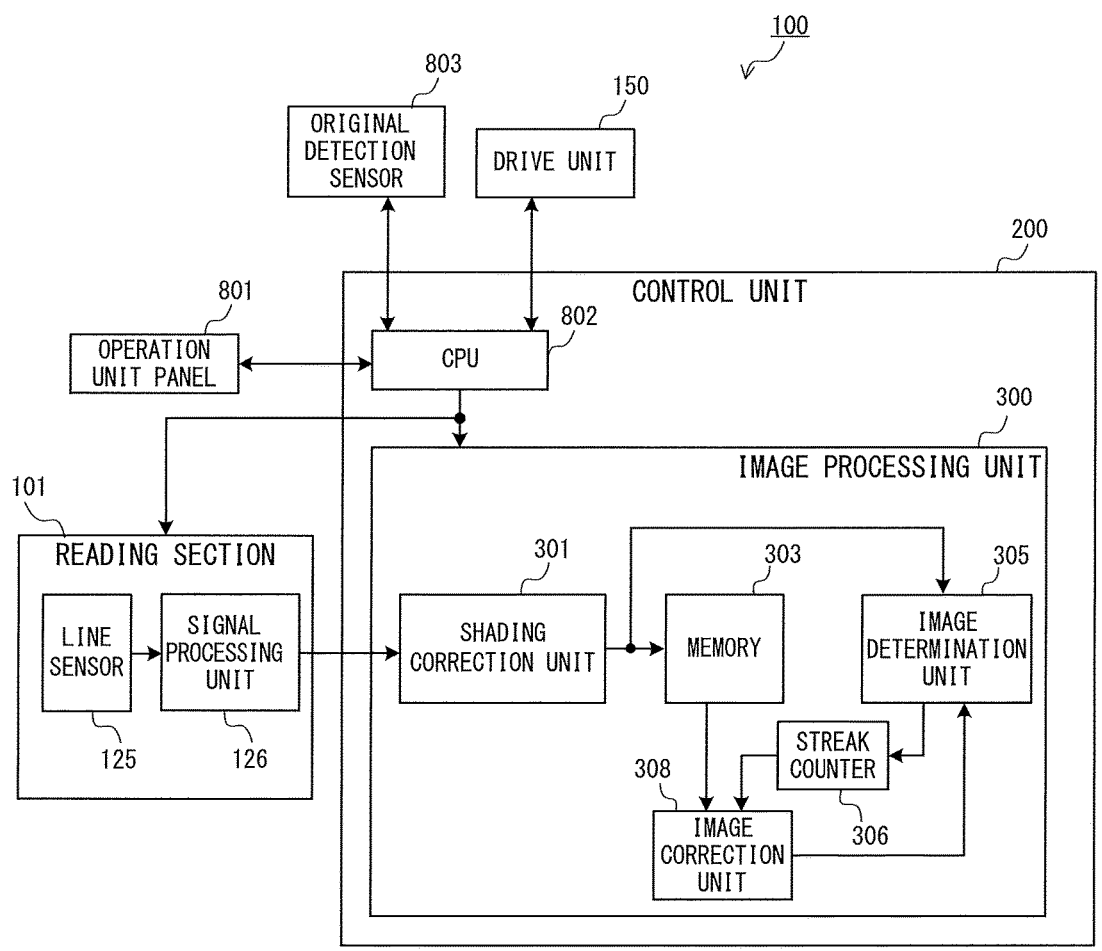
FIG. 2 is a functional block diagram of the image reading apparatus.

FIG. 2 is a functional block diagram of the image reading apparatus 100. In FIG. 2, a CPU 802 provided in the control unit 200 controls the operation of the image reading apparatus 100 to convey and read an original. More specifically, the first conveyance rollers 111, the second conveyance roller 112, the third conveyance roller 113, the drive motor 140, and other such components configured to perform driving in the image reading apparatus 100 are controlled by the CPU 802. In FIG. 2, those components are collectively illustrated as a drive unit 150.

An image processing unit 300 included in the control unit 200 receives input of the image data obtained from the line sensor 125 through the signal processing unit 126 in the reading section 101 of the image reading apparatus 100. The CPU 802 controls the reading section 101 and the image processing unit 300 to detect an abnormal image due to foreign particles or the like from the image data input from the signal processing unit 126, and to perform image processing on the abnormal image. In this embodiment, a streak is detected as the abnormal image, and the image processing is performed on the streak.

To that end, the image processing unit 300 acquires the image data from the reading section 101, and stores the acquired image data in a memory 303 being storage means as necessary, to thereby determine the presence or absence of a streak image and correct the streak image.

The image processing unit 300 includes a shading correction unit 301, the memory 303, an image determination unit 305, a streak counter 306, and an image correction unit 308. In this embodiment, a dynamic random-access memory (DRAM) is used as the memory 303. The image processing unit 300 uses those components to perform image correction.

The reading section 101 is controlled by the CPU 802 to read the original 103 in a flow reading mode through use of the ADF 102. The reading section 101 generates image data representing the image on the read original 103, and transmits the image data to the image processing unit 300. The image processing unit 300 acquires the image data transmitted from the reading section 101.

The image processing unit 300 causes the shading correction unit 301 to perform shading correction on the acquired image data. The shading correction unit 301 generates image data by correcting an influence of unevenness in light amounts of the light sources 119 and 120 or an influence of sensitivity of the line sensor 125 through the shading correction. The image processing unit 300 stores the image data in the memory 303 as necessary.

The image determination unit 305 extracts candidate pixels of the streak image. The streak counter 306 counts the number of pixels of the detected streak image, and the image correction unit 308 performs streak image correction described later. Those processing steps are described later in detail.

The CPU 802 is connected to a console panel 801. The console panel 801 includes an operation screen for receiving input of an instruction to start to read an original or other such instruction from a user. The CPU 802 is also connected to the drive motor 140 and to an original detection sensor 803 provided on an original conveyance path, for detecting the presence or absence of an original.

When the CPU 802 is instructed to start to read an original by the user through the console panel 801, the CPU 802 drives the drive motor 140 to start to convey the original. After that, the original detection sensor 803 provided on the original conveyance path transmits, to the CPU 802, a flag signal for notifying that the original has passed through the original detection sensor 803.

When receiving the flag signal, the CPU 802 controls the line sensor 125 to start to read the image data at a time at which the original reaches the reading position. As a result, the image data on the original is input to the image processing unit 300 through the signal processing unit 126. The CPU 802 controls the image processing unit 300 to detect and correct the streak image being the abnormal image due to foreign particles involved in the reading.

Figure 3:
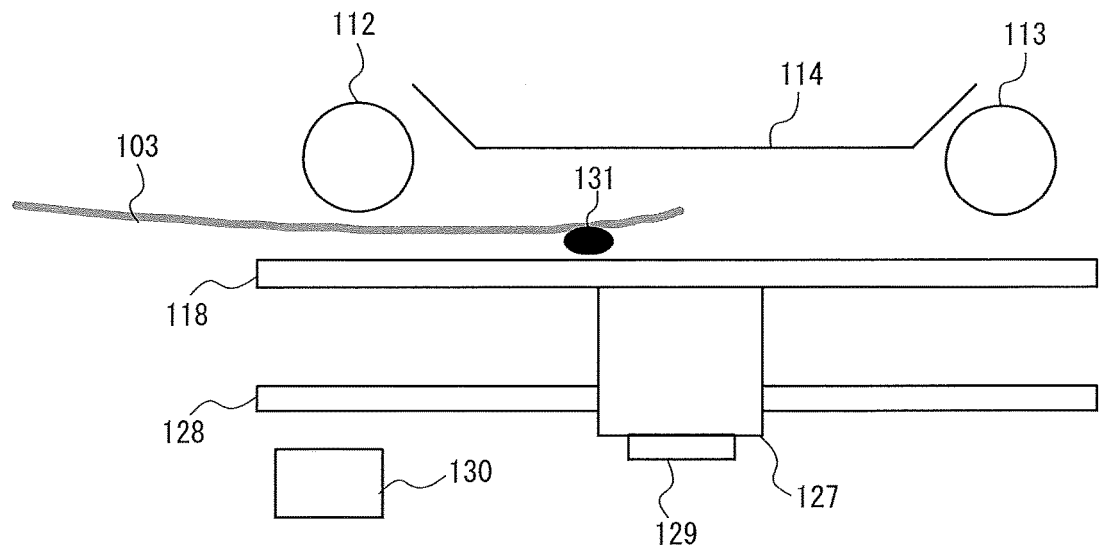
FIG. 3 is an explanatory diagram of a mechanism by which a streak image is formed.
Figure 4:
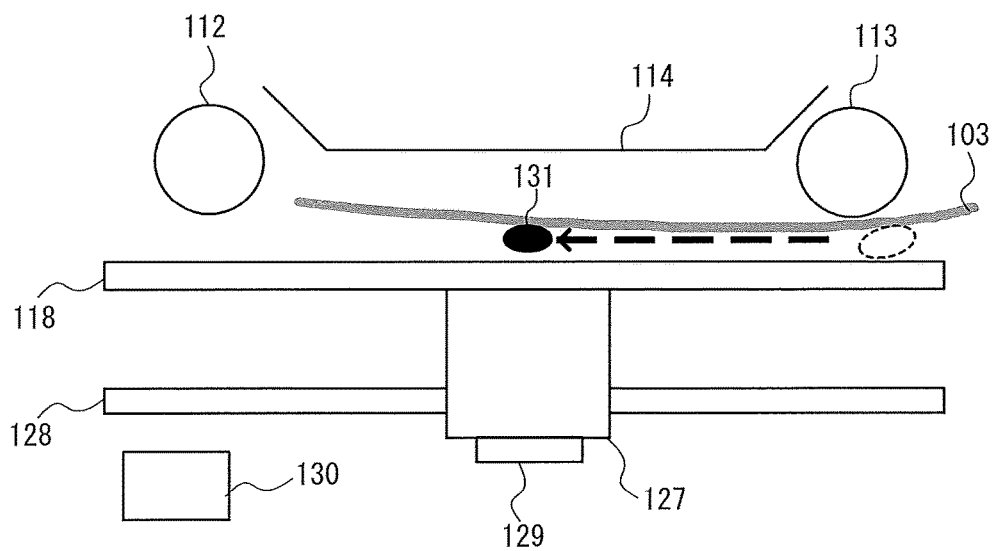
FIG. 4 is an explanatory diagram of a mechanism by which a streak image is formed.

FIG. 3 and FIG. 4 are explanatory diagrams of a mechanism by which a streak image is formed. Under the control of the CPU 802, the original 103 is sequentially conveyed by the second conveyance roller 112 and the third conveyance roller 113. At this time, as illustrated in FIG. 3, foreign particles 131, for example, paper dust or peeled-off toner that has been formed in accordance with the conveyance also adheres to the original 103, and is conveyed along with the original 103.

Therefore, the reading unit 127 reads the foreign particles 131, which have been conveyed along with the original 103, together with the original 103. In a vicinity of the reading position, the original is pressed against the reading glass 118 by the white opposing member 114. Therefore, as illustrated in FIG. 4, even when the original 103 is moved from the reading position, the foreign particles 131 may stay at the reading position, or may adhere to the reading glass 118 due to static electricity in some cases.

Figure 5:
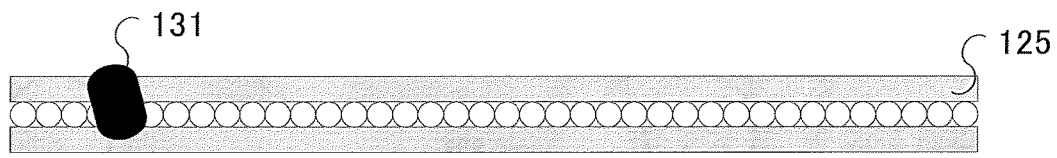
FIG. 5 is an explanatory diagram of a state under which foreign particles have covered a line sensor.

As a result, as illustrated in FIG. 5, the foreign particles 131 may sometimes stay at such a position as to cover the reading position of the line sensor 125. In this case, as illustrated in FIG. 6, not only the image of the original but also abnormal images each having a streak shape are intermittently formed in the image data obtained by reading the original.

In order to discriminate the thus formed streaks from the image data, the streak images are detected through use of a vertical line extraction filter and the streak counter 306 being a counter for counting the number of streak pixels that form a linear streak image formed in the conveyance direction of the original.

Figure 6:
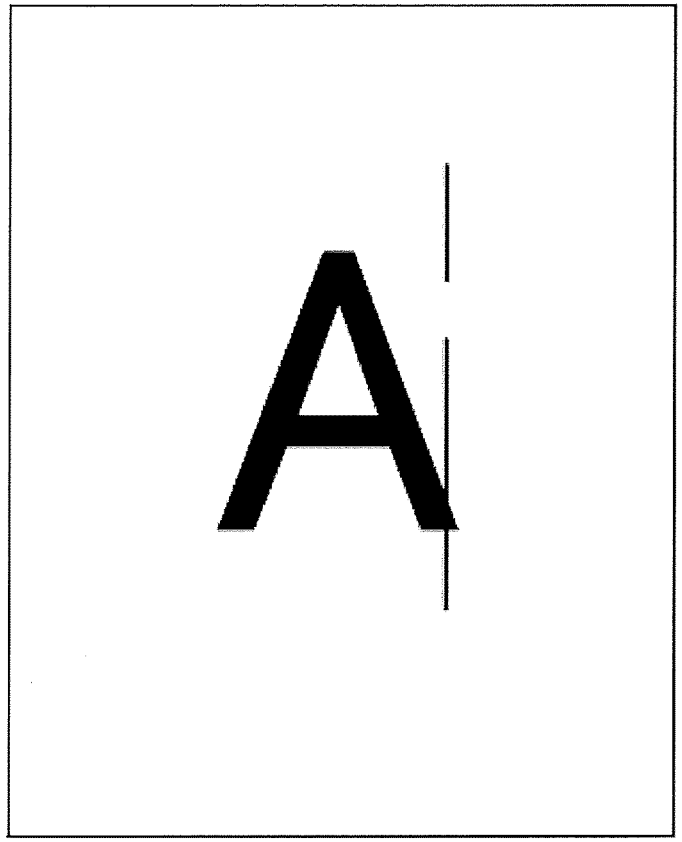
FIG. 6 is an explanatory diagram of an example in which streaks have been formed.

In order to detect such streak images as illustrated in FIG. 6, the control unit 200 determines whether or not a pixel of interest is a streak image candidate based on the image data on the pixel of interest and pixels that surround the pixel of interest. Specifically, the control unit 200 applies the vertical line extraction filter illustrated in FIG. 7 to the pixel of interest and the pixels that surround the pixel of interest, and determines based on the image data on the pixel of interest whether or not the pixel of interest is a candidate pixel of a streak image. Details thereof are described below. In this example, vertical lines having a three-pixel width are extracted.

The image determination unit 305 extracts the candidate pixels of the streak image. To that end, the image determination unit 305 performs a filter operation by applying the vertical width extraction filter of FIG. 7 to each pixel. The filter operation is performed based on the following expression assuming that the conveyance direction of the original is represented by a sub-scanning direction "Y", the direction perpendicular to the conveyance direction is represented by a main scanning direction "X", the image data is represented by "D", and a filter coefficient is represented by "F". In the filter operation, 4×3 pixels with the pixel of interest being set as the center are used.

$$\Sigma\Sigma D(X,Y) * F(X,Y) \qquad \text{Expression (1)}$$

Figures 7, 8:
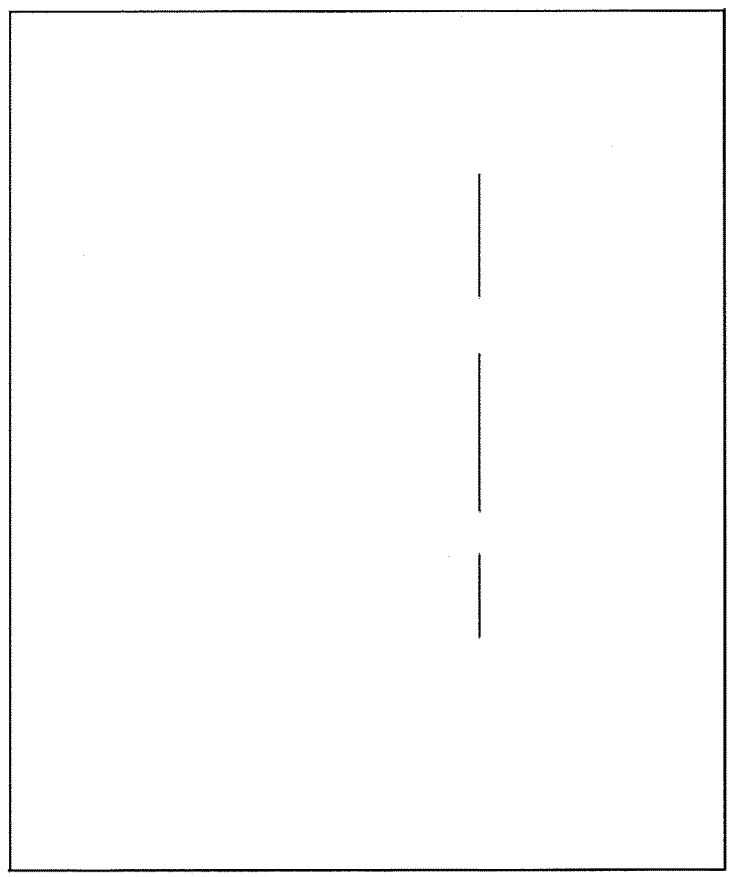
FIG. 7 is an explanatory diagram of a filter for extracting a streak having a three-pixel width.
FIG. 8 is an explanatory diagram of an example in which streaks have been extracted based on the filter.

A result of performing the filter operation based on Expression (1) is compared with a predetermined threshold value, to thereby be able to extract only parts having the vertical lines having a three-pixel width as illustrated in FIG. 8. The image determination unit 305 counts the number of continuous streak pixels in the extracted vertical line, and when the count value becomes equal to or larger than a predetermined correction threshold value, determines that a streak has been detected.

The image determination unit 305 further decrements the count value by one in a part in which no vertical line is extracted, that is, in a part in which no streak pixel is detected and the streak has come to an end, and when the count value becomes smaller than the correction threshold value, determines that the streak has come to an end.

In this example, as illustrated in FIG. 7, a filter for detecting the streak having a three-pixel width is used. However, it is possible to detect a streak having any width by taking a similar method depending on the width of the streak to be detected. For example, detection of respective streaks having widths of one to six pixels can be achieved by providing six kinds of filters corresponding to the respective widths and counting the number of continuous streak pixels in the extracted vertical line.

Figure 9:
FIG. 9 is a diagram for illustrating an example of foreign particles and images before correction performed through image processing.
Figure 9:
Figure 9:
Figure 10:
FIG. 10 is an explanatory diagram of an image after correction performed through the image processing.

As an example of a streak image correction method performed when the presence of a streak is determined, there is known a linear interpolation method for performing the correction through use of linear interpolation based on surrounding normal pixels. For example, when a streak is detected at a position illustrated in FIG. 9, the linear interpolation is performed through use of a pixel next to the streak based on the following Expression (2), to thereby obtain a corrected image as illustrated in FIG. 10.

$$X_x = X_{left} + \{(X_{right} - X_{left})/(n+1)\} \cdot x \qquad \text{Expression (2)}$$

where $X_x$ represents an x-th pixel subjected to the linear interpolation, n represents the width of the streak, and $X_{right}$ and $X_{left}$ represent pixels to the left and the right of the streak, respectively.

Figure 11:
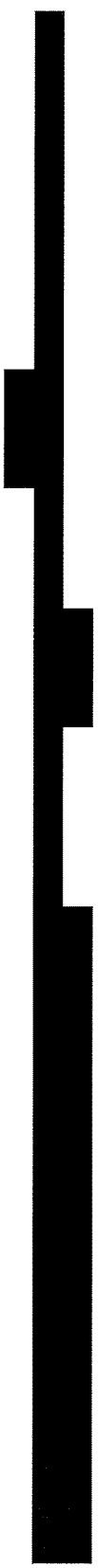
FIG. 11 is a diagram for illustrating an example of a streak that has been formed.
Figure 12:
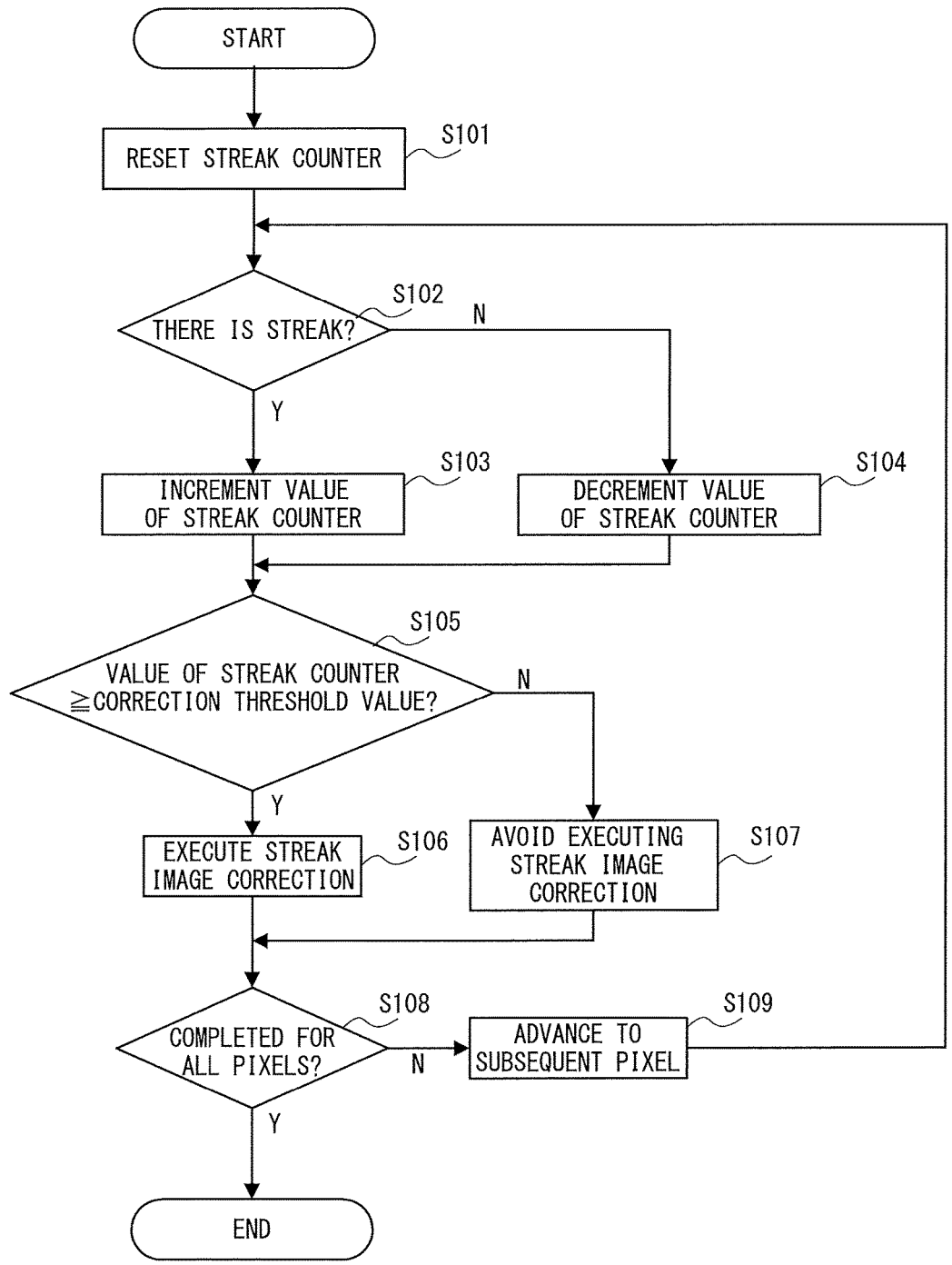
FIG. 12 is a flowchart of processing for detecting and correcting a streak.
Figure 13:
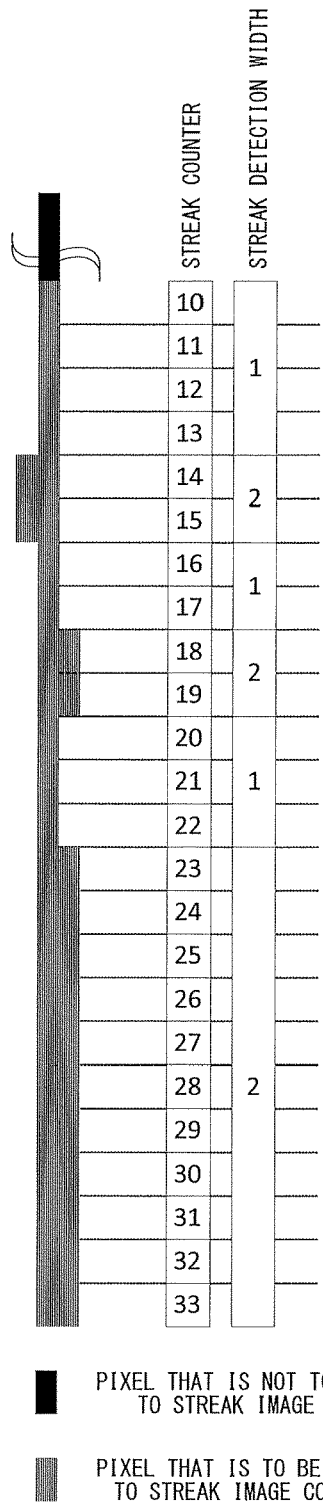
FIG. 13 is an explanatory diagram of a streak counter and a streak detection width.

Now, as a comparative example, processing for detecting and correcting a streak illustrated in FIG. 11 is described by using the above-mentioned linear interpolation method as the streak image correction method. FIG. 12 is a flowchart of detection and correction of a streak. FIG. 13 is an explanatory diagram of the streak counter 306 and a streak detection width for the image data input to the image processing unit 300. Unless otherwise specified, the processing of FIG. 12 is executed by the CPU 802.

Referring to FIG. 12, when an original is conveyed and the reading section 101 starts to perform reading, the image data is input to the control unit 200, and the detection and correction of a streak are started. The CPU 802 of the control unit 200 resets the value of the streak counter 306, which is configured to count the continuity of the streak, to "0" (Step S101).

Subsequently, the CPU 802 performs the filter operation expressed by Expression (1) to determine whether or not there is a streak for each line in the perpendicular direction (Step S102). In this case, the perpendicular direction (main scanning direction) represents a direction perpendicular to the sub-scanning direction corresponding to the conveyance direction of the original. When determining that there is a streak (Y in Step S102), the CPU 802 detects a streak width being a width of the streak image in the perpendicular direction, and performs incremental processing for adding one to the value of the streak counter 306 (Step S103). Meanwhile, when determining that there is no streak (N in Step S102), the CPU 802 performs decremental processing for subtracting one from the value of the streak counter 306 (Step S104). Thus, the count value of the streak counter is subjected to the addition when there is a streak and to the subtraction when there is no streak, and is therefore a value indicating a degree of continuity of the streak image candidate in the conveyance direction.

The CPU 802 compares the count value of the streak counter 306 with the correction threshold value (Step S105). When the count value is equal to or larger than the correction threshold value (Y in Step S105), the CPU 802 executes the streak image correction by the above-mentioned linear interpolation method (Step S106). When the count value is smaller than the threshold value (N in Step S105), the CPU 802 avoids executing the streak image correction (Step S107). The CPU 802 determines whether or not streak determination has been completed for all the pixels in the sub-scanning direction (Step S108). When the streak determination has not been completed (N in Step S108), the CPU 802 again executes Step S102 in order to perform the streak determination for all the pixels (Step S109). When the streak determination has been completed for all the pixels (Y in Step S108), the CPU 802 brings the processing to an end.

Next, a description is given of processing performed when the value of the streak counter 306 exceeds the correction threshold value. FIG. 13 is an illustration of processing performed after the value of the streak counter 306 advances as far as to detect a streak. The streak illustrated in FIG. 13 extends in the sub-scanning direction. The streak counter 306 serves to perform the detection of the streak for each line extending in the main scanning direction.

As a result, in FIG. 13, the streak counter value is "10" for the first line extending in the main scanning direction, and the streak counter value is "11" for the subsequent line. Thus, the streak is detected for all the subsequent lines. In FIG. 13, the values of the streak counter 306 and the values of the streak detection width are values regarding pixels that form a streak at the center among the streaks extending in the sub-scanning direction.

In this comparative example, the streak at the center is detected at streak counter values of "10" to "33", and a streak on the left is detected at the streak counter values of "14" and "15". A streak on the right is detected at the streak counter values of "18", "19", and "23" to "33".

In the comparative example, even when the streak width becomes thicker or thinner at some midpoint, the streak is detected so as to follow the change in width. Therefore, as illustrated in FIG. 13, every detected streak is subjected to the streak image correction, to thereby be able to obtain a result that follows the change in width of the streak.

However, a part in which a thick or thin streak is detected may be temporarily formed in some cases due to, for example, the movement of foreign particles at some midpoint or the presence of an original image in a background having been erroneously detected as a streak.

In the following description, when the streak width increases, a streak pixel positioned in an added part of a streak is referred to as "added pixel". For example, when the streak width increases to a two-pixel width while a streak having a one-pixel width is being detected, a streak pixel in the added part corresponds to the "added pixel".

In this case, in the method of the above-mentioned comparative example, even when the streak width temporarily increases, the added pixel is also subjected to the streak image correction so as to follow the change in width. For example, when the streak width increases, the streak image correction is performed by including the pixel in the added part. In the example of FIG. 13, the streak detection width is "2" for the pixels at positions at which the streak counter 306 exhibits the values of "14", "15", "18", and "19", and the streak detected based on the pixels is determined as the streak to be corrected as it is.

Therefore, when the streak image correction is performed, a correction area becomes wider with an uneven width of the streak to be corrected, and hence a correction trace becomes noticeable in an image obtained as a result of performing the streak image correction on the entire image.

Figure 19:
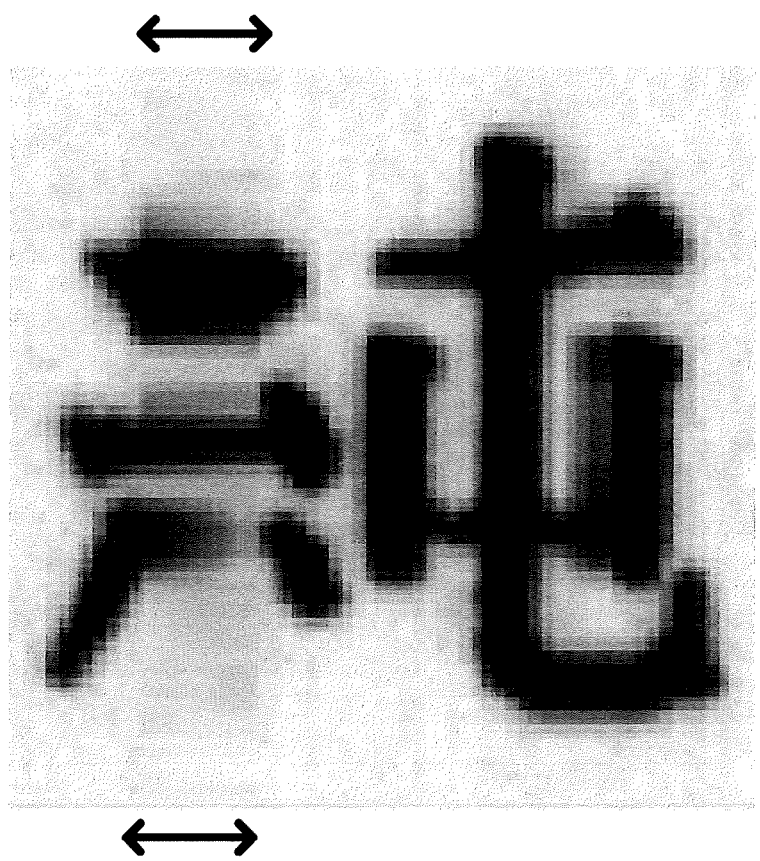
FIG. 19 is an explanatory diagram of a streak image after correction.

This also leads to a fear that, when the temporarily formed streak is corrected as a target of the streak image correction as it is, it becomes difficult to interpret the original image in the background as a result of the correction as described above with reference to FIG. 19

EXAMPLE

In this Example, when the streak width increases, the number of pixels for which the added pixel continuously appears in the sub-scanning direction is counted, and when the added pixel continuously appears for the number of pixels equal to or larger than a predetermined number of pixels, the added pixel is recognized as forming the streak, and the streak image correction is performed while the added pixel is included in the streak image. Otherwise, the added pixel is recognized as not forming the streak, and the streak image correction is performed while the added pixel is not included in the streak image. With this method, the read image in which the correction trace is not noticeable is obtained.

Figure 14:
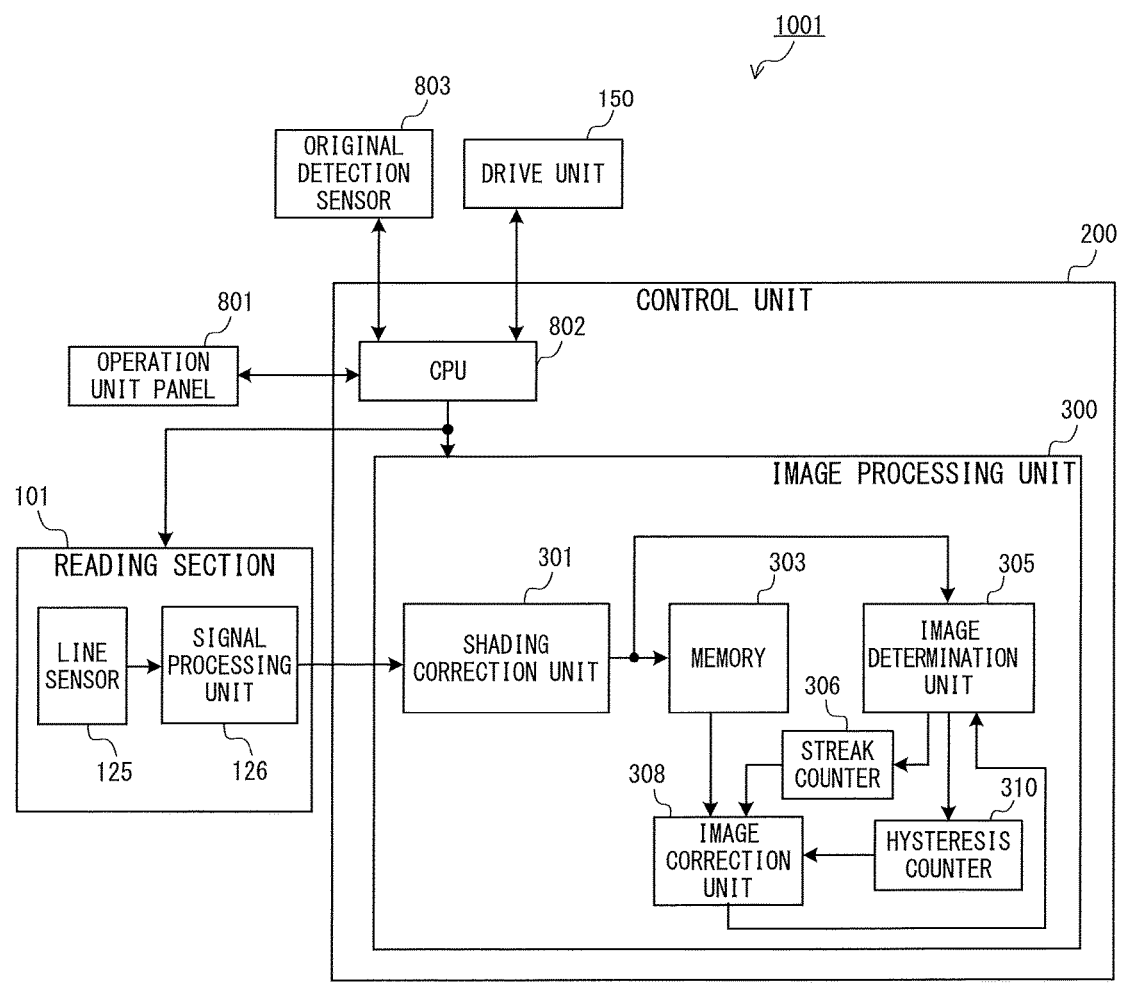
FIG. 14 is a functional block diagram of an image reading apparatus.
Figure 15:
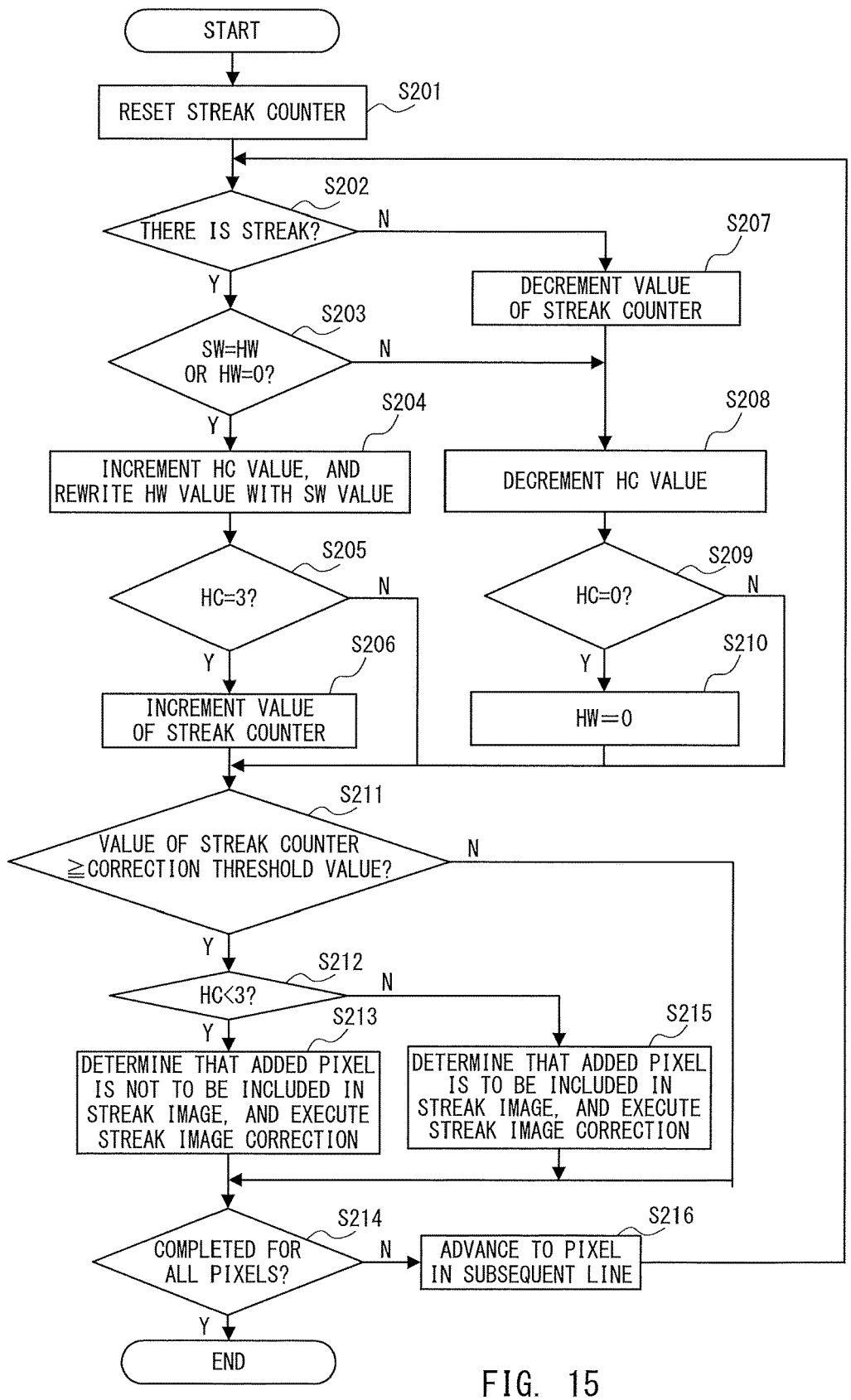
FIG. 15 is a flowchart of processing for correcting a streak image.
Figure 16:
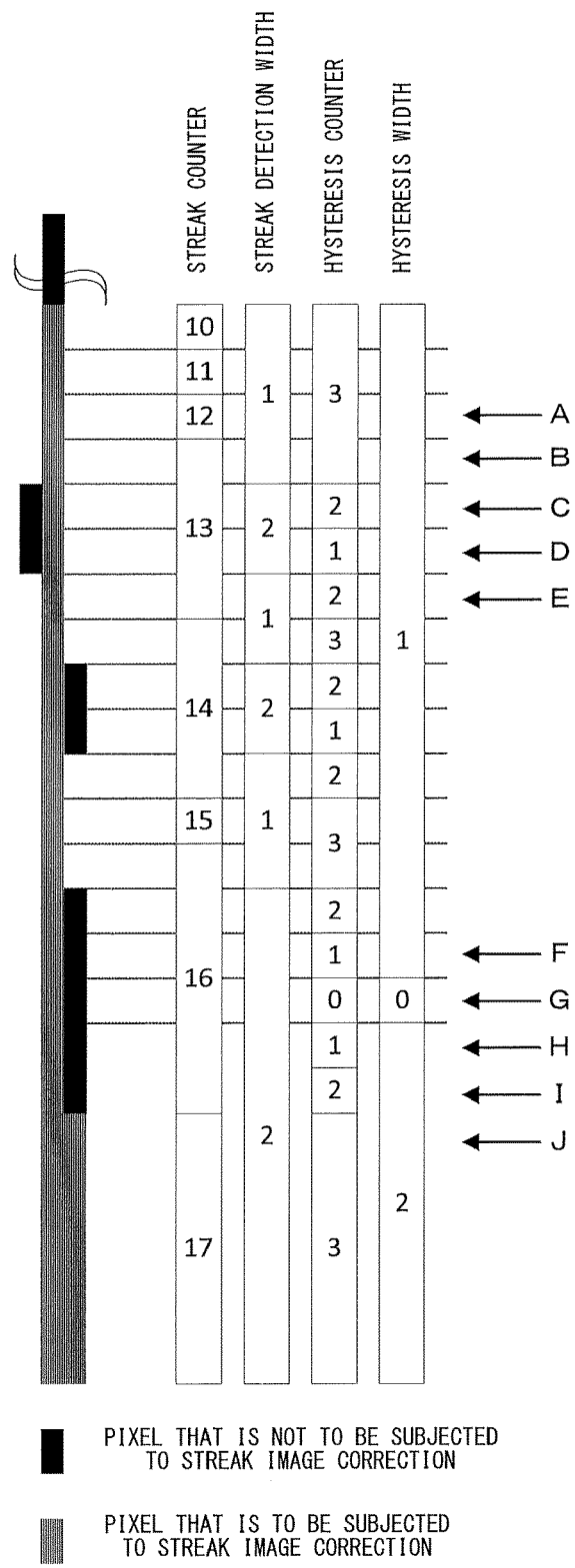
FIG. 16 is an explanatory diagram of a relationship among the streak counter, the streak detection width, a hysteresis counter, and a hysteresis width.
Figure 17:
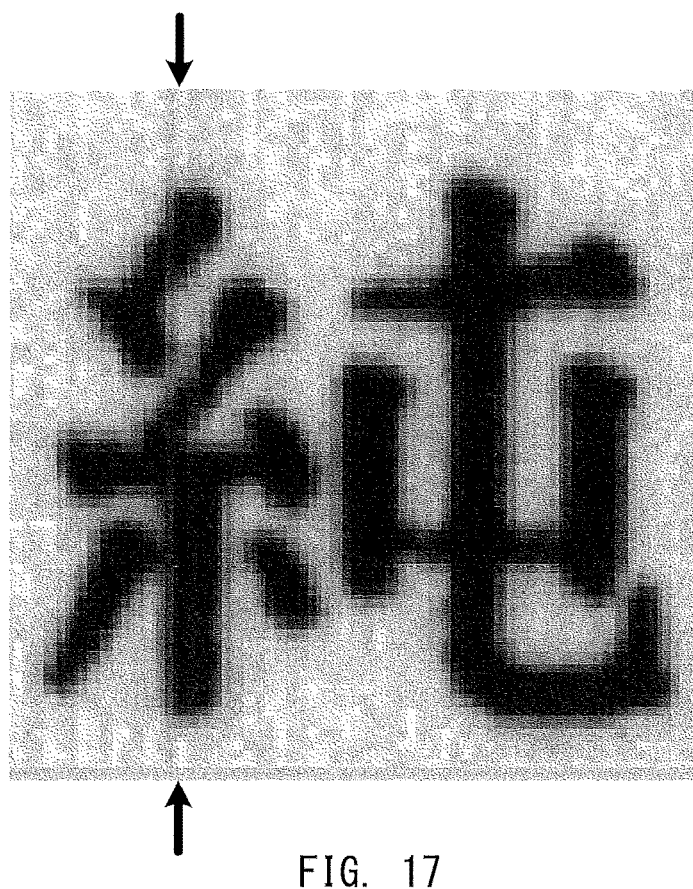
FIG. 17 is an explanatory diagram of a streak image.
Figure 18:
FIG. 18 is an explanatory diagram of a streak image after correction.

FIG. 14 is a functional block diagram of an image reading apparatus 1001 according to this Example. As illustrated in FIG. 14, the image processing unit 300 of the image reading apparatus 1001 includes a hysteresis counter 310. The other components of the image reading apparatus 1001 have the same configuration as those of the image reading apparatus 100 described above with reference to FIG. 2. FIG. 15 is a flowchart of processing for detecting and correcting a streak in this Example. FIG. 16 is an explanatory diagram of a relationship among the value of the streak counter, the streak detection width, a hysteresis counter value of the hysteresis counter 310, and the value of a hysteresis width. The value of the detected streak width is used as an initial value of the value of the hysteresis width. The value of a detected width of the streak, which is obtained first, is maintained until the hysteresis counter value becomes "0". When the hysteresis counter value becomes the lower limit value ("0" in this example), the value of the hysteresis width is set to "0". The value of the hysteresis width is stored in the memory 303 (hysteresis width storage means).

Now, a description is given of a streak determination flow for determining whether or not the added pixel is to be included in the streak with reference to FIG. 14, FIG. 15, and FIG. 16. In the streak determination flow, the detection of a streak is performed on each pixel in the sub-scanning direction to obtain the streak detection width, and the value of the streak detection width is updated with the obtained value of the streak detection width. After that, the value of the updated streak detection width is used to change the value of the streak counter 306, the hysteresis counter value, and the value of the hysteresis width as illustrated in the flowchart of FIG. 15. The hysteresis counter 310 is set to have an upper limit value of "3" and a lower limit value of "0". Unless otherwise specified, the processing described with reference to FIG. 15 is executed by the CPU 802.

Details thereof are described below. When an original is conveyed and the reading section 101 starts to perform reading, the CPU 802 starts the processing for detecting and correcting a streak being an abnormal image.

As illustrated in FIG. 15, the CPU 802 of the control unit 200 first resets each of the value of the streak counter 306, the hysteresis counter value, and the hysteresis width to zero (Step S201). Subsequently, the CPU 802 performs the filter operation expressed by Expression (1) to determine whether or not there is a streak for each main scanning position (Step S202). When determining that there is a streak (Y in Step S202), the CPU 802 detects the streak width being the width of the streak image in the perpendicular direction, and determines whether a streak detection width (SW) is equal to a hysteresis width (HW) or whether the hysteresis width is zero (Step S203). In this manner, in Step S202, the CPU 802 performs the filter operation of Expression (1) to determine whether or not the pixel of interest is a streak image candidate, and when the pixel of interest is a streak image candidate, detects the streak width in the direction perpendicular to the conveyance direction of the original.

When neither the streak detection width is equal to the hysteresis width nor the hysteresis width is zero (N in Step S203), the CPU 802 executes Step S208 described later. Meanwhile, when the streak detection width is equal to the hysteresis width or the hysteresis width is zero (Y in Step S203), the CPU 802 increments a hysteresis counter (HC) value, and rewrites the value of the hysteresis width with the value of the detected streak width (Step S204). After that, the CPU 802 determines whether or not the hysteresis counter value is the upper limit value, namely, "3" (Step S205). When the hysteresis counter value is the upper limit value of "3" (Y in Step S205), the CPU 802 increments (adds one to) the value of the streak counter 306 (Step S206), and executes Step S211 described later. Otherwise (N in Step S205), the CPU 802 executes Step S211 without changing the value of the streak counter 306.

Meanwhile, when determining in Step S202 that there is no streak (N in Step S202), the CPU 802 decrements (subtracts one from) the value of the streak counter 306 (Step S207), and decrements the hysteresis counter value (Step S208). When the determination of Step S203 results in N, the CPU 802 also decrements the hysteresis counter value in the same manner (Step S208).

After Step S208 is executed, the CPU 802 determines whether or not the hysteresis counter value is the lower limit value of "0" (Step S209), and when the hysteresis counter value is "0" (Y in Step S209), resets the hysteresis width to zero (Step S210) to execute Step S211 described later. Otherwise (N in Step S209), the CPU 802 executes Step S211 without changing the hysteresis width (Step S210).

In Step S211, the CPU 802 compares the count value of the streak counter 306 with the correction threshold value. When the count value is smaller than the correction threshold value ("10" in this Example) (N in Step S211), the CPU 802 advances to Step S214 described later without performing the streak image correction. When the count value of the streak counter 306 is equal to or larger than the correction threshold value (Y in Step S211), the CPU 802 then determines based on the count value of the streak counter whether or not the pixel of the streak image candidate is to be corrected. Then, a correction width of the streak image to be corrected by the image processing unit 300 in the direction perpendicular to the conveyance direction is determined based on the hysteresis counter. Specifically, the CPU 802 determines whether or not the hysteresis counter value is smaller than the upper limit value, namely, smaller than "3" (Step S212). When the hysteresis counter value is smaller than "3" (Y in Step S212), the CPU 802 determines that the added pixel is not to be included in the streak image (Step S213), and executes the streak image correction by the above-mentioned linear interpolation method without including the added pixel in the streak. After that, the CPU 802 determines whether or not the streak determination has been completed for all the pixels in the main scanning direction (Step S214). When the streak determination has not been completed (N in Step S214), the CPU 802 advances to a pixel in the subsequent line (Step S216), and again executes Step S202. When the streak determination has been completed for all the pixels (Y in Step S214), the CPU 802 brings the processing to an end.

Meanwhile, when the hysteresis counter value is the upper limit value of "3" in Step S212 (N in Step S212), the CPU 802 determines that the added pixel is to be added to the streak image (Step S215), executes the streak image correction by the above-mentioned linear interpolation method by including the added pixel in the streak image, and advances to Step S214.

In this example, the CPU 802 is configured to execute the streak image correction in Step S213 and Step S215 before advancing to the subsequent steps. However, a timing to perform the streak image correction can be freely set as long as the timing follows the determination as to whether or not to perform the streak image correction.

FIG. 16 is an explanatory diagram of a relationship among the streak counter value, the streak detection width, the hysteresis counter value, and the hysteresis width for the same image data as that of the comparative example illustrated in FIG. 13. As described above, those values including the streak counter value are the values regarding the pixels that form the streak at the center. In the same manner, arrows A to J indicate pixels that form the streak at the center on lines indicated by the arrows A to J, respectively.

In the example of FIG. 16, in the same manner as in FIG. 13, the detection of a streak is also performed on each line extending in the main scanning direction. However, in this Example, the streak counter value is incremented based on the flowchart illustrated in FIG. 15. Therefore, unlike in FIG. 13, there is a case in which the value of the streak counter 306 is not incremented even when the streak is detected. For example, for the pixels indicated by the arrows B to E, the streak is detected, but the streak counter value is maintained at "13" over the four lines.

Now, the streak image correction for a streak image illustrated in FIG. 15 is described with reference to FIG. 16. In this example, the streak is detected for all the pixels, and hence the determination of Step S202 results in Y to execute Step S203 in all the cases.

In the pixel on the line indicated by the arrow B, the streak detection width has a value of "1", and the value of the hysteresis width at this time point is the value of the hysteresis width of the pixel indicated by the arrow A, namely, "1". Therefore, the determination of Step S203 results in Y, and the hysteresis counter value is incremented in Step S204. However, the hysteresis counter value at this time point is "3" being the hysteresis counter value for the pixel indicated by the arrow A, which is the maximum value. Therefore, the hysteresis counter value for the pixel indicated by the arrow B is maintained at "3". In addition, in Step S204, the hysteresis width for the pixel indicated by the arrow B is set to "1" being the streak detection width. In Step S205, the determination results in Y due to the hysteresis counter value being "3", and in Step S206, the value of the streak counter 306 is set to "13" by incrementing the value of "12" for the pixel indicated by the arrow A. In addition, the value of the streak counter 306 is "13", which is a value equal to or larger than the correction threshold value being "10", and hence the determination of Step S211 results in Y. The determination of Step S212 results in N due to the hysteresis counter value being "3" at this time point, and hence the CPU 802 determines in Step S215 that the added pixel is to be included in the streak image to execute the streak image correction. However, there is no added pixel on the line including the pixel indicated by the arrow B, and hence the CPU 802 executes the streak image correction on the streak of one pixel.

Subsequently, the streak detection width has a value of "2" for the pixel indicated by the arrow C, and the value of the hysteresis width at this time point is the value of the hysteresis width for the pixel indicated by the arrow B, namely, "1". Therefore, the determination of Step S203 results in N, and in Step S208, the hysteresis counter value is set to "2" by decrementing the value of "3" for the pixel indicated by the arrow B. The hysteresis counter value is not "0", and hence the determination of Step S209 results in N, which inhibits the hysteresis width from being reset. The value of the streak counter 306 is the value of "13" equal to or larger than the correction threshold value, and hence the determination of Step S211 results in Y. The determination of Step S212 results in Y due to the hysteresis counter value being "2" at this time point. Therefore, in Step S213, the CPU 802 executes the streak image correction on the streak of one pixel without including the added pixel in the streak.

The streak detection width has a value of "2" for the pixel indicated by the arrow D, and the value of the hysteresis width at this time point is the value of the hysteresis width for the pixel indicated by the arrow C, namely, "1". In addition, the hysteresis width is not "0". Therefore, the determination of Step S203 results in N, and in Step S208, the hysteresis counter value is set to "1" by decrementing the value of "2" for the pixel indicated by the arrow C. The hysteresis counter value is not "0", and hence the determination of Step S209 results in N, which inhibits the hysteresis width from being reset. The value of the streak counter 306 is the value of "13" equal to or larger than the correction threshold value, and hence the determination of Step S211 results in Y. The determination of Step S212 results in Y due to the hysteresis counter value being "1" at this time point. Therefore, in Step S213, the CPU 802 executes the streak image correction on the streak of one pixel without including the added pixel in the streak.

The streak detection width has a value of "1" for the pixel indicated by the arrow E, and the value of the hysteresis width at this time point is the value of the hysteresis width for the pixel indicated by the arrow B, namely, "1". Thus, the values are equal to each other. Therefore, the determination of Step S203 results in Y, and in Step S204, the hysteresis counter value is incremented. The hysteresis counter value at this time point is "1" being the hysteresis counter value for the pixel indicated by the arrow D, and hence the hysteresis counter value for the pixel indicated by the arrow E is set to "2". In addition, in Step S204, the hysteresis width for the pixel indicated by the arrow E is set to "1" being the streak detection width. In Step S205, the determination results in N due to the hysteresis counter value being "2". In addition, the value of the streak counter 306 is the value of "13" equal to or larger than the correction threshold value, and hence the determination of Step S211 results in Y. The determination of Step S212 results in Y due to the hysteresis counter value being "2" at this time point. Therefore, in Step S213, the CPU 802 executes the streak image correction on the streak of one pixel without including the added pixel in the streak.

Meanwhile, the streak detection width has a value of "2" for the pixel indicated by the arrow G, and the value of the hysteresis width at this time point is the value of the hysteresis width for the pixel indicated by the arrow F, namely, "1". Thus, the values are different from each other. In addition, the hysteresis width is not "0". Therefore, the determination of Step S203 results in N, and in Step S208, the hysteresis counter value is set to "0" by decrementing the value of "1" for the pixel indicated by the arrow F. The hysteresis counter value is "0", and hence the determination of Step S209 results in Y, so that the value of the hysteresis width is reset to "0". The value of the streak counter 306 is the value of "16" equal to or larger than the correction threshold value, and hence the determination of Step S211 results in Y. The determination of Step S212 results in Y due to the hysteresis counter value being "0" at this time point. In Step S213, the CPU 802 executes the streak image correction on the streak of one pixel without including the added pixel in the streak.

The streak detection width has a value of "2" for the pixel indicated by the arrow H, and the value of the hysteresis width at this time point is the value of the hysteresis width for the pixel indicated by the arrow G, namely, "0". Therefore, the determination of Step S203 results in Y, and in Step S204, the hysteresis counter value is set to "1" by incrementing the value of "0" for the pixel indicated by the arrow G. In addition, in Step S204, the value of the hysteresis width for the pixel indicated by the arrow H is changed to "2" being the streak detection width. In Step S205, the determination results in N due to the hysteresis counter value being "1" and smaller than an HC threshold value, and the value of the streak counter 306 is not incremented. The value of the streak counter 306 is the value of "16" equal to or larger than the correction threshold value, and hence the determination of Step S211 results in Y. The determination of Step S212 results in Y due to the hysteresis counter value being "1". In Step S213, the CPU 802 executes the streak image correction on the streak of one pixel without including the added pixel in the streak.

The streak detection width has a value of "2" for the pixel indicated by the arrow I, and the value of the hysteresis width at this time point is the value of the hysteresis width for the pixel indicated by the arrow H, namely, "2". Therefore, the determination of Step S203 results in Y, and in Step S204, the hysteresis counter value is set to "2" by incrementing the value of "1" for the pixel indicated by the arrow H. In addition, in Step S204, the value of the hysteresis width for the pixel indicated by the arrow I is changed to "2" being the streak detection width. In Step S205, the determination results in N due to the hysteresis counter value being "2", and the value of the streak counter 306 is not incremented. The value of the streak counter 306 is the value of "16" equal to or larger than the correction threshold value, and hence the determination of Step S211 results in Y. The determination of Step S212 results in Y due to the hysteresis counter value being "2". In Step S213, the CPU 802 executes the streak image correction on the streak of one pixel without including the added pixel in the streak.

The streak detection width has a value of "2" for the pixel indicated by the arrow J, and the value of the hysteresis width at this time point is the value of the hysteresis width for the pixel indicated by the arrow I, namely, "2". Therefore, the determination of Step S203 results in Y, and in Step S204, the hysteresis counter value is set to "3" by incrementing the value of "2" for the pixel indicated by the arrow I. In addition, in Step S204, the value of the hysteresis width for the pixel indicated by the arrow B is changed to "2" being the streak detection width. In Step S205, the determination results in Y due to the hysteresis counter value being "3", and in Step S206, the value of the streak counter 306 is set to "17" by incrementing the value of "16" for the pixel indicated by the arrow I. The value of the streak counter 306 is the value of "17" equal to or larger than the correction threshold value, and hence the determination of Step S211 results in Y. The determination of Step S212 results in N due to the hysteresis counter value being "3". In Step S215, the CPU 802 executes the correction processing on the streak of two pixels by including the added pixel in the streak.

With the processing based on such a flow, the streak counter 306 decrements the count value when no streak is detected, and when the count value is smaller than a predetermined value, the streak image correction is not performed. In general, a streak is formed of continuous pixels. Therefore, even in a case where there are pixels determined to be included in a streak, it is sometimes not desirable to perform streak image correction when the pixels are not continuous and have a large number of break points. In this example, the streak image correction is not performed when the count value of the streak counter 306 has not reached the predetermined value, which can prevent such undesirable streak image correction.

Further, even when the width of the streak including the added pixel increases due to the presence of the original image in the background, the movement of foreign particles, or the like as illustrated in FIG. 16, the CPU 802 performs the streak image correction without adding the added pixel to the streak until the hysteresis counter value becomes equal to or larger than the threshold value. Therefore, the streak width before the increase is maintained until the increased streak width is maintained over a length equal to or longer than a given length.

When the increased streak width is maintained over a length equal to or longer than a predetermined length, a detection result corresponding to the width of the streak is obtained, and hence the read image exhibiting little adverse effect ascribable to the image correction can be obtained through the correction of the streak being the abnormal image due to foreign particles. The above-mentioned example is described by taking an exemplary case in which the streak width increases. However, the present invention can also be applied to a case in which the streak width decreases. Assuming that a pixel positioned in a subtracted part of the streak is referred to as "subtracted pixel", for example, when the streak width decreases to a one-pixel width while a streak having a two-pixel width is being detected, a pixel in the subtracted part corresponds to the "subtracted pixel".

The processing performed in this case is substantially the same processing as the processing performed based on the flowchart of FIG. 15. However, in Step S215 of FIG. 15, the CPU 802 determines that the streak width including the added pixel has increased by reflecting that the increase in streak width has been sufficiently maintained with the hysteresis counter value being 3. Then, the streak image correction is performed on the streak including the added pixels.

In the case where the streak width decreases, when the hysteresis counter value is 3, the CPU 802 performs the streak image correction by reflecting that the decrease in streak width has been sufficiently maintained. To that end, the CPU 802 performs the streak image correction on the streak having a decreased streak width without including the subtracted pixel. As a result, the processing of Step S215 is replaced by the step of "determining that the subtracted pixel is not to be included in the streak and executing the streak image correction". In the same manner, the processing of Step S213 is replaced by the step of "determining that the subtracted pixel is to be included in the streak and executing the streak image correction". The other processing steps are the same as the processing steps illustrated in the flowchart of FIG. 15.

As described above, in this embodiment, when the hysteresis counter value is smaller than "3" being the upper limit value of the hysteresis counter value, the CPU 802 performs the streak image correction without including the added pixel in the streak image. Therefore, it is possible to suppress an adverse effect of correcting the streak as a thick streak as a result of correcting the streak by following the change in streak thickness.

Therefore, it is possible to correct a streak image so as to prevent the correction trace from becoming noticeable even when the streak changes in thickness.

The processing described with reference to FIG. 15 and the like can be achieved by, for example, an application specific integrated circuit (ASIC) or a system-on-a-chip (SoC).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-076526, filed Apr. 7, 2017 which is hereby incorporated by reference herein in its entirety.

What is claimed is:

1. An original reading apparatus, comprising:
an original tray on which an original is to be placed;
a conveyor configured to convey the original from the original tray to a reading position;
a reader configured to read the original being conveyed by the conveyor, and to output image data; and
an image processor configured to detect a streak image based on the image data, and to correct the detected streak image,
wherein the image processor is configured to:
determine, based on the image data on a pixel of interest and pixels that surround the pixel of interest, whether the pixel of interest is a streak image candidate;
determine, in a case where the pixel of interest is a streak image candidate, a streak image width in a direction perpendicular to a conveyance direction of the original;
determine, based on first information indicating a degree of continuity of the streak image candidate in the conveyance direction, whether the pixel of the streak image candidate is to be corrected; and
determine a correction width of the streak image to be corrected by the image processor in the direction perpendicular to the conveyance direction based on second information indicating a degree of continuity of the streak image candidate having the same streak image width, in the conveyance direction.

2. An original reading apparatus according to claim 1, wherein the first information includes counter information to be incremented and decremented based on the second information and a result of determining whether the pixel of interest is a streak image candidate.

3. An original reading apparatus according to claim 1, wherein the second information includes counter information to be incremented in a case where the streak image width of the streak image candidate is continuously maintained at the same value, and to be decremented when a value of the streak image width becomes a different value.

4. An original reading apparatus according to claim 1, wherein the image processor is configured to determine, in a case where counter information of the first information indicates a value smaller than a threshold value, that the pixel of the streak image candidate is not to be corrected.

5. An original reading apparatus according to claim 1, wherein the image processor is configured to determine, in a case where the streak image width of the streak image candidate increases, which one of streak image correction performed by including an added pixel, which is a pixel that forms an added part of a streak width, and streak image correction performed without including the added pixel is to be performed on the streak image candidate based on the second information.

6. An original reading apparatus according to claim 1, wherein the image processor is configured to perform streak image correction by including an added pixel, which is a pixel that forms an added part of a streak width, in a case where a value indicated by counter information of the second information reaches a predetermined value.

* * * * *